US011258577B2

(12) United States Patent
Zerbe

(10) Patent No.: US 11,258,577 B2
(45) Date of Patent: *Feb. 22, 2022

(54) LOW POWER EDGE AND DATA SAMPLING

(71) Applicant: Rambus Inc., San Jose, CA (US)

(72) Inventor: Jared L. Zerbe, Woodside, CA (US)

(73) Assignee: Rambus Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/914,226

(22) Filed: Jun. 26, 2020

(65) Prior Publication Data
US 2020/0403769 A1 Dec. 24, 2020

Related U.S. Application Data

(63) Continuation of application No. 15/907,200, filed on Feb. 27, 2018, now Pat. No. 10,708,036, which is a continuation of application No. 13/695,245, filed as application No. PCT/US2011/032338 on Apr. 13, 2011, now Pat. No. 9,923,711.

(60) Provisional application No. 61/330,221, filed on Apr. 30, 2010.

(51) Int. Cl.
H04L 7/033 (2006.01)
H04L 7/00 (2006.01)

(52) U.S. Cl.
CPC .......... H04L 7/0332 (2013.01); H04L 7/0008 (2013.01); H04L 7/0033 (2013.01); H04L 7/0037 (2013.01)

(58) Field of Classification Search
CPC ... H04L 7/0008; H04L 7/0033; H04L 7/0037; H04L 7/0332
See application file for complete search history.

(56) References Cited

U.S. PATENT DOCUMENTS

| 5,127,026 A | 6/1992 | Kelly et al. |
| 5,247,213 A | 9/1993 | Trinh et al. |
| 5,309,483 A | 5/1994 | Oliboni et al. |
| 6,396,329 B1 | 5/2002 | Zerbe |
| 6,832,325 B2 | 12/2004 | Liu |
| 7,058,150 B2 | 6/2006 | Buchwald et al. |
| 7,124,221 B1 | 10/2006 | Zerbe et al. |
| 7,173,993 B2 | 2/2007 | Engl et al. |
| 7,471,691 B2 | 12/2008 | Black et al. |
| 7,486,746 B2 | 2/2009 | Laturell et al. |
| 9,923,711 B2 | 3/2018 | Zerbe |

(Continued)

FOREIGN PATENT DOCUMENTS

WO WO-2011-126619 A1 10/2011

OTHER PUBLICATIONS

Notification Concerning Transmittal of International Preliminary Report on Patentability (Chapter 1) dated Nov. 15, 2012 for Application No. PCT/US2011/032338, includes Written Opinion. 12 pages.

(Continued)

Primary Examiner — David B Lugo
(74) Attorney, Agent, or Firm — Lance Kreisman; Peninsula Patent Group

(57) ABSTRACT

An integrated circuit receiver is disclosed comprising a data receiving circuit responsive to a timing signal to detect a data signal and an edge receiving circuit responsive to the timing signal to detect a transition of the data signal. One of the data or edge receiving circuits comprises an integrating receiver circuit while the other of the data or edge sampling circuits comprises a sampling receiver circuit.

20 Claims, 5 Drawing Sheets

(56) References Cited

U.S. PATENT DOCUMENTS

| | | |
|---|---|---|
| 2004/0096013 A1 | 5/2004 | Laturell et al. |
| 2004/0165617 A1 | 8/2004 | Wu et al. |
| 2005/0018760 A1 | 1/2005 | Smith et al. |
| 2005/0226355 A1 | 10/2005 | Kibune et al. |
| 2005/0237086 A1 | 10/2005 | Galloway et al. |
| 2006/0170453 A1 | 8/2006 | Zerbe et al. |
| 2007/0217559 A1 | 9/2007 | Stott et al. |
| 2009/0243681 A1 | 10/2009 | Zerbe et al. |
| 2010/0315142 A1 | 12/2010 | Zerbe |

OTHER PUBLICATIONS

PCT Invitation to Pay Additional Fees dated Aug. 11, 2011 re PCT Int'l. Application No. PCT/US2011/032338 includes partial Int'l. Search. 7 Pages.

PCT Search Report and Written Opinion dated Oct. 19, 2011 re Int'l. Application No. PCT/US2011/032338. 17 Pages.

LOW POWER EDGE AND DATA SAMPLING

CROSS-REFERENCE TO RELATED APPLICATIONS/TECHNICAL FIELD

This application is a Continuation of U.S. patent application Ser. No. 15/907,200, filed Feb. 27, 2018, entitled "LOW POWER EDGE AND DATA SAMPLING", which is a Continuation of U.S. patent application Ser. No. 13/695,245, filed Oct. 29, 2012, entitled "LOW POWER EDGE AND DATA SAMPLING", now U.S. Pat. No. 9,923,711, which claims priority from International Application No. PCT/US2011/032338, published as WO 2011/139503 A1 on Nov. 10, 2011, which claims priority from U.S. Provisional Application No. 61/330,221, filed Apr. 30, 2010 and entitled "LOW POWER EDGE AND DATA SAMPLING". U.S. application Ser. No. 13/695,245, International Application No. PCT/US2011/032338 and U.S. Provisional Application No. 61/330,221 are hereby incorporated by reference in their entirety. The disclosure herein relates to signaling systems and more particularly to receiver circuits having edge and data samplers.

BACKGROUND

Tracking timing between data and an associated timing signal, such as a clock signal, is important for high-speed signaling systems. Conventionally, identical edge and data samplers are often used to maintain clock/data timing, each responsive to respective clock signals offset in phase by approximately 90 degrees. While this can work well for its intended applications, generating the additional 90 degree clock signal often presents pin and/or requires additional power at the receiver end. Thus, the need exists for a pin and power-efficient tracking solution for high-speed signaling systems.

BRIEF DESCRIPTION OF THE DRAWINGS

Embodiments of the disclosure are illustrated by way of example, and not by way of limitation, in the figures of the accompanying drawings and in which like reference numerals refer to similar elements and in which.

DETAILED DESCRIPTION

Embodiments of integrated circuit receivers are disclosed herein. One embodiment of the receiver comprises a data receiving circuit and an edge receiving circuit. The data receiving circuit responds to a timing signal to detect a data signal at a location with significant timing margins, while the edge receiving circuit responds to the timing signal to detect a transition of the data signal and give a determination of the data being 'early' or 'late' compared to an ideal phase position for sampling data. One of the data or edge receiving circuits comprises an integrating receiver circuit while the other of the data or edge receiving circuits comprises a sampling receiver circuit. Employing an integrating receiver and a sampling receiver circuit together in the integrated circuit receiver improves efficiencies in both power and pin count.

In one embodiment, a method of operation in an integrated circuit receiver is presented. The method includes receiving a data signal having a valid data region and a transition region. A timing signal is also received, such that a data value in the valid data region is detected in response to the timing signal. An edge value in the transition region is also detected in response to the timing signal to generate early/late information. One of detecting the data or edge value comprises integrating in response to the timing signal.

In a further embodiment, a signaling system is described. The system comprises a first integrated circuit device including a transmitter circuit to transmit a data signal and an accompanying timing signal. A second integrated circuit device is employed and includes a receiver circuit to receive the data signal and the timing signal. The receiver circuit includes a first receiving circuit responsive to a timing signal to detect a valid data region of a data signal. A second receiving circuit responds to the timing signal to detect a transition region associated with the data signal. One of the first or second receiver circuits comprises an integrating receiver circuit, while the other of the first or second receiver circuits comprises a sampling receiver circuit.

Figure 1:
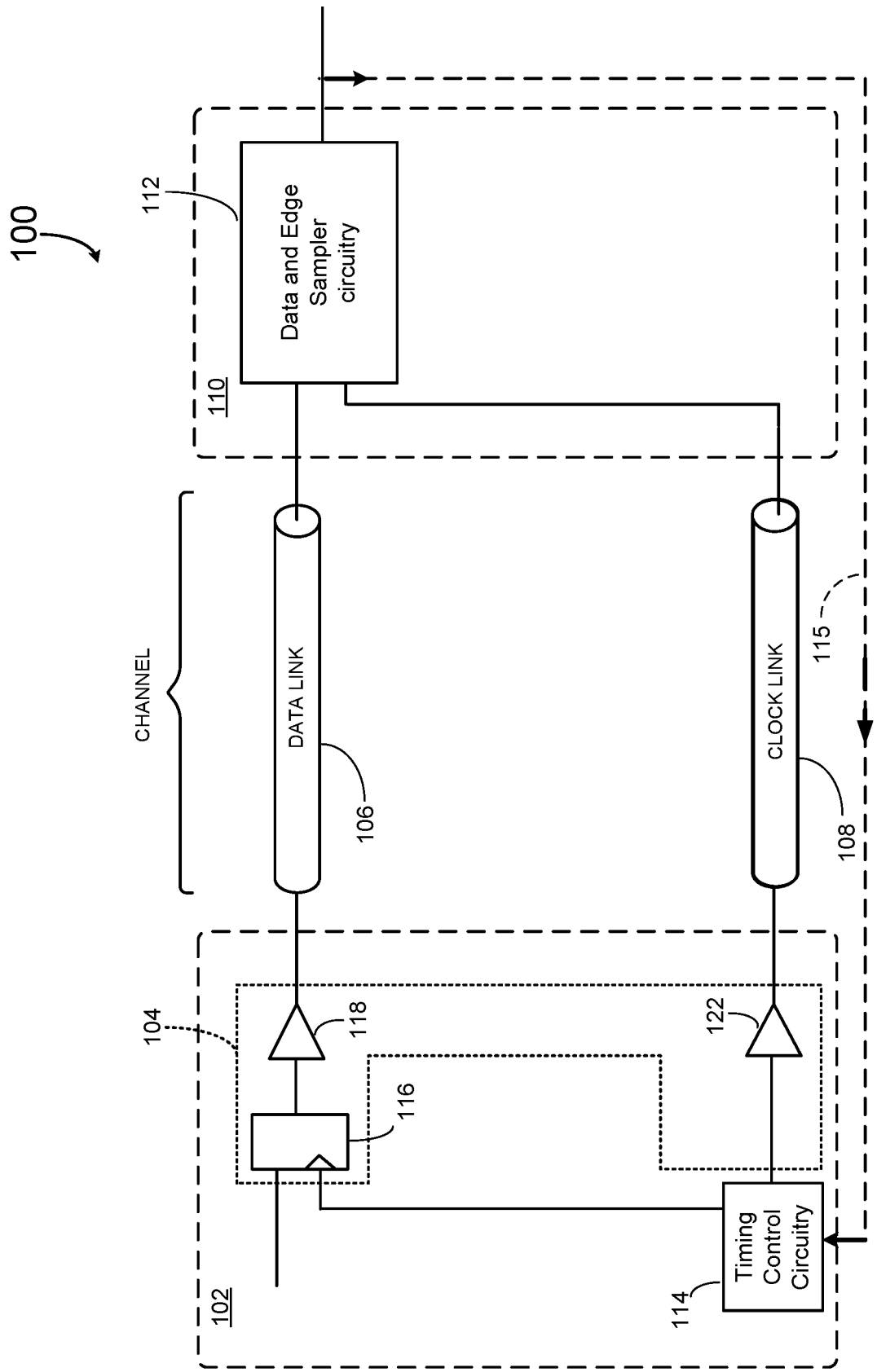
FIG. 1 illustrates a block diagram of a signaling system according to an embodiment.

FIG. 1 illustrates a block diagram of a signaling system 100 according to an embodiment. The signaling system 100 includes a clock and data recovery (CDR) loop including a first integrated circuit device (IC) 102 and a second IC device 110. Transmitter circuitry 104 on the first IC device 102 drives a data symbol, or signal, along a data link or path 106. An associated source-synchronous timing reference, such as a clock signal, is transmitted by the transmitter circuitry 104 along a timing reference link, such as clock path 108. Timing control circuitry 114 disposed on the first integrated circuit device 114 controls adjustment of the relative phases of the clock and data signals. Receiver circuitry 112, in the form of respective data and edge receiver circuits, is disposed on the second integrated circuit device (IC) 110, to receive and detect data and edge values of the data signals (received via data link 106) in response to the clock signals (received via clock path 108).

The transmitter circuitry 104 employs a data transmitter in the form of a clocked storage element 116, such as a flip-flop, having a data input to receive a serial data stream and a clock input to receive a clock signal. The flip-flop generates data in response to the clock, where it is buffered and driven across the data link 106 by an optional output buffer 118. In some embodiments, the transmitter circuitry 104 may include an equalizer (not shown) to provide transmit-side equalization that modifies the data signal to minimize the effects of anticipated inter-symbol-interference. While only one data link 106 is shown for purposes of clarity, a plurality of data links configured as a parallel bus may be employed, each with its own associated transmitter and receiver circuitry.

To provide the source-synchronous timing reference, the transmitter circuitry 104 includes a clock driver 122 coupled to the timing control circuitry 114. The clock driver generally includes an input to receive a timing reference, such as a clock signal, from the timing control circuitry and an output to drive the clock signal across the clock link 108. The timing control circuitry 114 generates the clock signals for the data and clock drivers and controls and adjusts the phase relationship between the respective clock signals to correspondingly adjust the timing relationships between the data transmitted on the data link and the clock signal transmitted on the clock link. While many of the embodiments described herein illustrate a source-synchronous context for the teachings herein, it should be understood that a variety of timing architectures are suitable for the data and edge receiver circuits described. For instance, the data and timing reference may be embedded together, or take on a mesochronous or pleisiochronous relationship. Further, while a clock signal is described throughout the disclosure, the timing reference may take the form of an aperiodic strobe signal.

In some embodiments, an optional back-channel 115 (in phantom) provides a path for communicating phase error information from the second integrated circuit device 110 to the first integrated circuit device 102. The phase error information enables the timing control circuitry 114 to carry out adaptive, continuous, or periodically updated phase adjustments between clock and data. Other embodiments may employ the timing control circuitry on the second integrated circuit device 110, in which case the optional backchannel may comprise a straightforward feedback path completely routed on the second IC 110.

With continued reference to FIG. 1, the data and edge receiver circuitry 112 of the second IC 110 receives the data from the data link 106 to generate data and edge values that, when compared to each other, may be used to indicate phase error information. Generally speaking, taking data values involves detecting the data signal level in response to the timing signal within a valid data range. In contrast, taking edge values involves detecting the signal level in one of the transition regions located on each end of the valid data region. As more fully described below, in some embodiments, data and edge receiving is accomplished without the need for a second timing reference accompanying the data receiver. This desirably reduces power consumption and increases pin efficiency for the second IC 110.

Figure 2:
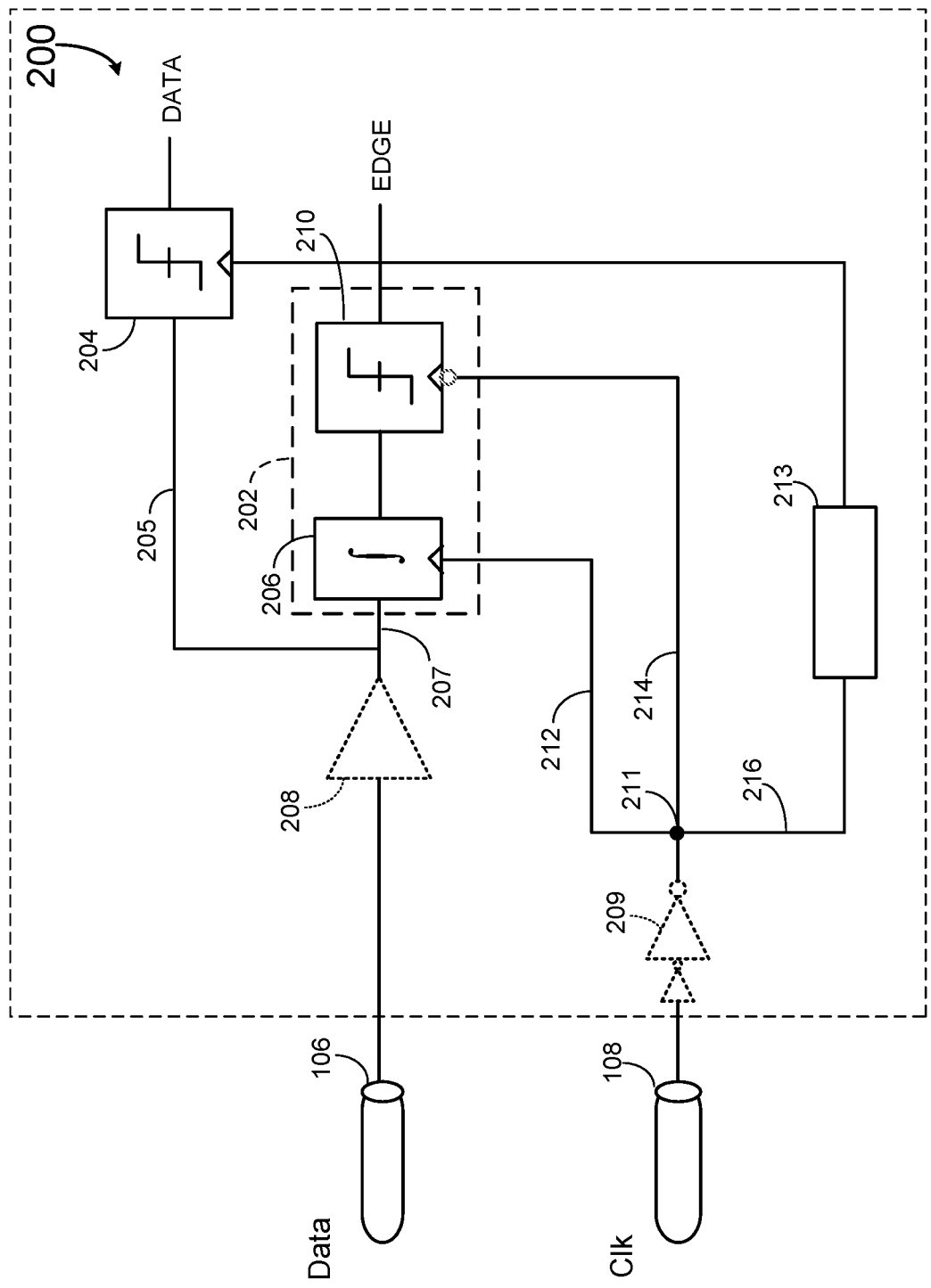
FIG. 2 illustrates a block diagram of an embodiment of a receiver apparatus within the signaling system of FIG. 1.

FIG. 2 illustrates a block diagram of one embodiment of a data and edge receiver circuitry 200. The data and edge receiver circuitry 200 employs an integrating receiver circuit 202 to provide edge information while a conventional first direct sampler (a non-integrating receiver) 204 performs a data sampler role. From a topological perspective, data propagating along the data link 106 (FIG. 1) follows respective edge and data receiver paths 207 and 205 to the inputs of the edge and data receivers 202 and 204 respectively. The clock link 108 (FIG. 1) feeds the clock signal through buffer circuitry 209 (optional) where it fans out from node 211 to respective precharge and sense integrating receiver edge clock paths 212 and 214, and a data clock path 216.

The integrating receiver circuit 202 includes an integrator 206 with a data input that receives a version of the data signal from an optional input buffer 208 via path 207, and a second direct sampler 210 to sample an output of the integrator 206. To receive respective precharge and sense portions of the edge clock, the integrator 206 and the second direct sampler 210 include respective opposing edge-triggered clock inputs. The integrator 206 may take various forms, including a saturating integrator, window integrator (with appropriately configured precharge and sense clocks skewed relative to each other by a delay in the precharge path), or the like. When using the integrator circuit as an edge receiver, a saturating integrator often provides optimum performance well-suited for balancing the time the data bit preceeds the clock edge versus the time the data bit follows the clock edge.

The first direct sampler 204 includes a data input to receive the data signal from the optional input buffer 208 via the data sample path 205. The direct sampler 204 includes a data clock input that receives a version of the clock signal via the data clock path 216. As more fully described below, in some instances, the data clock signal may be delayed to compensate either for propagation delays incurred through the data buffer 208 or for a setup time difference between the integrator 206 and the data sampler 204. In the embodiment of FIG. 2, the first IC 102 (FIG. 1) transmits the clock signal and data signal along respective data and clock links 106 and 108 (corresponding to the data and clock links 106 and 108 of FIG. 1) in a quadrature relationship (offset in phase by approximately 90 degrees). The phase offset allows the clock to trigger sampling of the data by the data sampler 204 near the center of the data eye.

Further referring to FIG. 2, various matching delay elements may be employed to account for first and second order delays attributable to differing propagation times for clock and data signals, and other similar effects. For example, first order matching may be accomplished by employing identical circuitry for the first and second direct samplers 204 and 210. This maintains consistent and predictable setup and hold timing between the two direct samplers. In some embodiments, a delay line 213 may be employed to delay the data clock signal to the first direct data sampler 204 by an amount corresponding to the delay incurred by the data signal through the front-end buffer 208 and switches or other circuitry affecting the setup time of the integrator 206.

Figure 3:
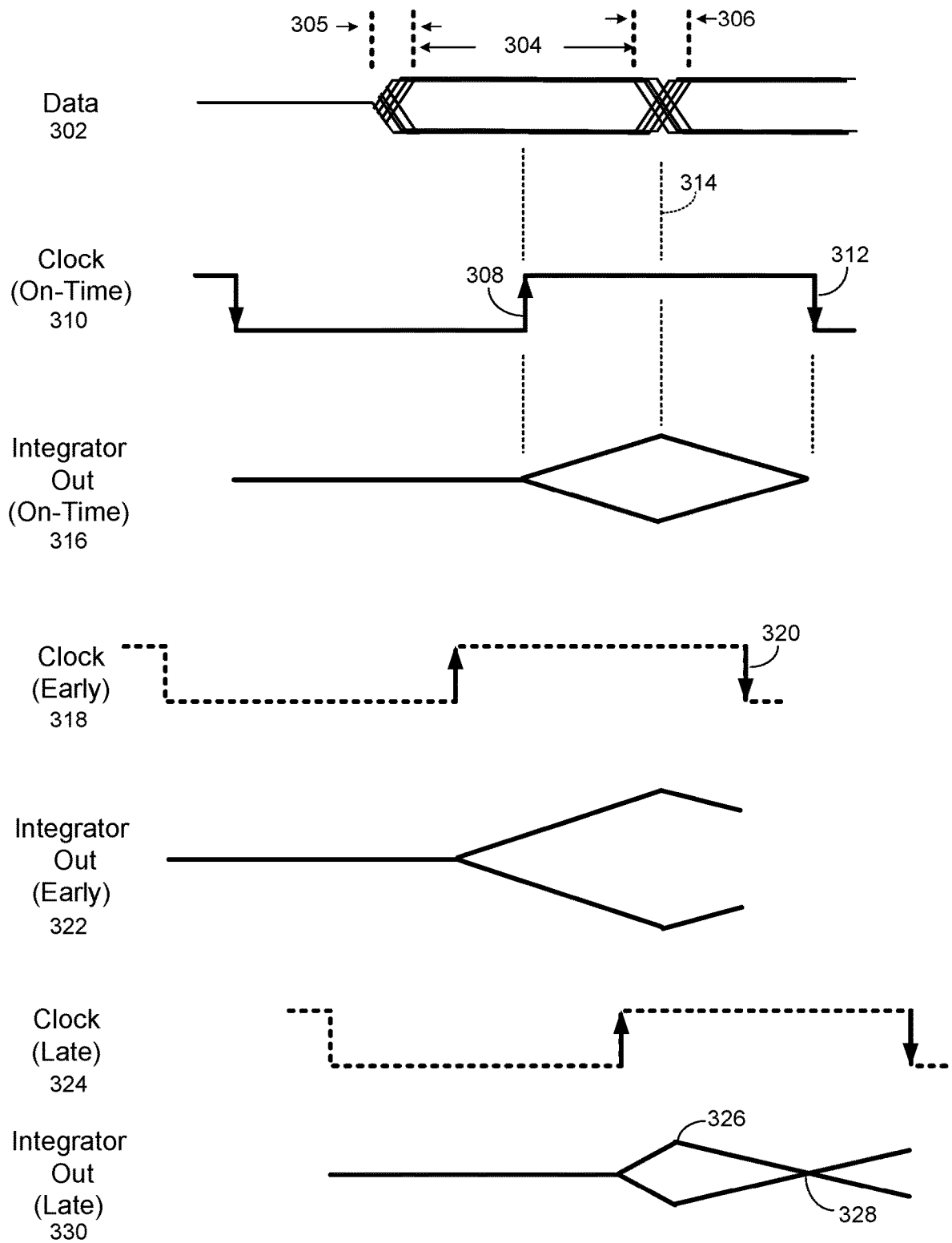
FIG. 3 illustrates a timing diagram relating to the receiver apparatus of FIG. 2.

FIG. 3 illustrates a timing diagram illustrating operation of the data and edge receiver circuit 200 of FIG. 2. Various data, clock and integrator output waveforms are shown having the same timing scale along the X-axis, with voltage represented along the Y-axis to denote logic signal levels "0" and "1" and analog voltage levels. A data waveform 302 reflects a DDR data signal with a single bit framed as a reference to illustrate a data eye. A first valid data region 304 lies between a first edge transition region 305 and a second edge transition region 306. A second valid data region 307 is adjacent the second edge transition region. As the timing input to the data sampler 204, a rising edge 308 of a clock signal 310 triggers sampling of the data signal (within the first valid data region 304). For purposes of this example, the clock signal 310 has an optimal 90 degree relationship with respect to the data bit. When clocking the integrator 206, the clock rising edge, at 308, represents a release of precharge of the integrator and thus the beginning of the integration period, while the falling edge of the clock, at 312, represents an activation of a sense-amp (not shown), and thus effectively ending the integration. For non-windowing integrators, the precharge and sense edges are reversed for the second data bit within the same clock signal. For windowed integrators, polarity inversion works on adjacent (odd/even) bits. Note that the same clock edge triggers precharge of the integrator 206 and sampling by the first direct sampler 204. Once activated by the precharge signal, the integrator 206 begins integrating the data by ramping from a zero differential (precharged) value to a maximum differential output value. When the data transitions to the opposite polarity during the second edge transition 306, such as indicated at 314, the integrator begins ramping the output differential voltage in the opposite direction. The sense edge triggers sampling of the integrator output by the second direct sampler 210. If the clock and data reflect the desired 90 degree offset, the integrator output value will be very near zero at the activation of sense, and the second direct sampler will end up sampling at the very edge of the integrator eye, possibly sampling a logic 1 or 0. A balanced integration interval is illustrated by the on-time integrator output waveform 316.

Further referring to FIG. 3, should the clock and data relationship be skewed, such that the clock is earlier in time than desired (shown by the early clock waveform 318), then the data sampler samples earlier in the first valid data range 304 (potentially overlapping into the first edge transition region 305). The integrator also correspondingly begins integrating earlier and continues increasing the integrator value until changing direction at the second data transition 306, at time 314. The integrator then decreases the integrator value until resetting. Just prior to reset, and responsive to the sense signal at 320, the integrator output is still relatively high, such that the sampled value indicates the output level of the first bit, as shown in the integrator output waveform 322.

Conversely, if the clock and data deskew such that the clock reflects a "late" relationship with respect to the first valid data region 304 (as shown by the late clock waveform 324), the data sampler 204 samples later in the valid data range (potentially overlapping into the second edge transition region 306), and the integrator 206 ramps up a positive integration value for a shorter duration, beginning a decrease at 326 when the data transition occurs. At 328, the continued decrease in the differential integration output value goes negative in magnitude. Consequently, when the second direct sampler 210 samples the integration output, the value is a logic 0, as shown in the integration output waveform 330.

The sampled integration values (or edge sampling values) may be accumulated over time and compared to the sampled data values to indicate whether the data and clock signals maintain a desired phase relationship. Alternately, the comparisons may be done directly in 'real time' and the value of the comparisons accumulated or averaged in order to create an 'early' or 'late' indication. For example, if multiple data samples indicate logic 1s, and multiple integrations (edge values) indicate logic 1s, then the clock can be assumed to be early relative to the data. Similarly, multiple disagreeing data and integration values may be assumed to indicate a late clock. In one embodiment, this information may be fed back to the timing control circuitry 114 (FIG. 1) to pre-skew the clock and data phase relationship in the desired manner to eliminate the receiver-side skew and effect a more precise quadrature relationship at the receiver. While a one-to-one correspondence between a data pin and a clock pin is shown and described above, yet other embodiments may employ a number of clock links less than the number of data links. Further, in a parallel bus environment where relative link timings may be similar, one or more data/edge sampling pins may share timing information with other data/edge pins. Sharing timing information in this fashion may enable significant power savings at the receiver. Other embodiments may employ even fewer pin resources by embedding the timing information with the data, and utilizing appropriate clock and data recovery techniques. Further, a variety of ways exist to utilize the phase data generated by edge and data receivers that are well-known to those having ordinary skill in the art, and warrant no further detail herein.

Figure 4:
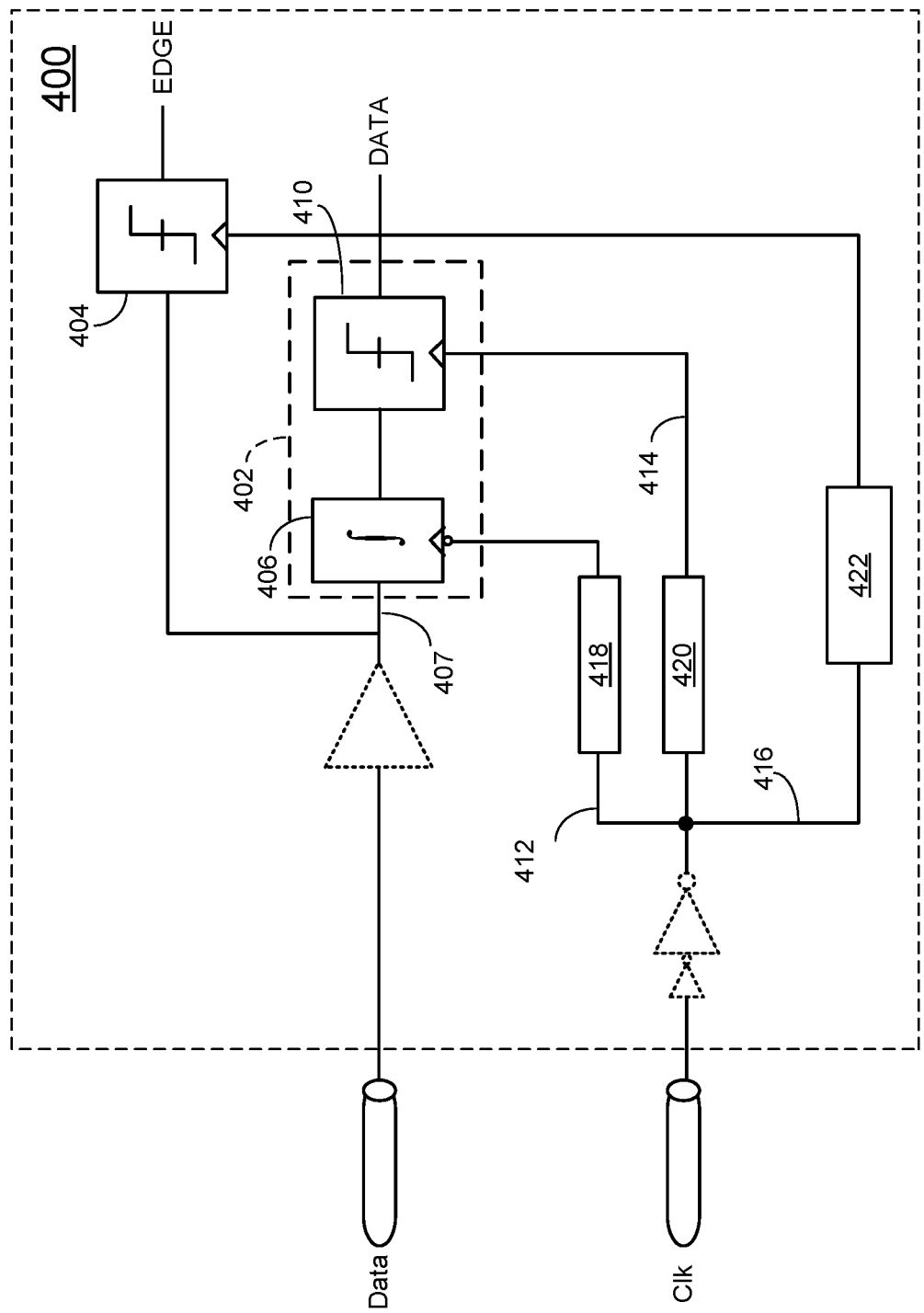
FIG. 4 illustrates a block diagram of an embodiment of a receiver apparatus within the system of FIG. 1.

FIG. 4 illustrates another embodiment of a data and edge receiver circuit, generally designated 400. Although structurally similar to the sampling circuit 200 of FIG. 2, the integrating and non-integrating circuit roles for the data and edge receivers are reversed. In this respect, the sampling circuit 400 employs an integrating data receiver circuit 402 as the data receiver, while a first direct sampler (a non-integrating receiver) 404 takes the role of the edge receiver. The integrating receiver circuit 402 includes an integrator 406 having an output coupled to a second direct sampler 410. One embodiment of the integrator 406 takes the form of a windowing integrator, in that the integration interval may be varied by adjusting delays associated with the precharge and sense signals. This allows framing the integration interval over an optimal data sampling region. Further detail concerning windowing integrators may be found, for instance, in U.S. Pat. No. 6,396,329.

Further referring to FIG. 4, the first and second direct samplers 404 and 410 include clock inputs responsive to rising edges of a clock signals SENSE, and CLK propagating along clock paths 414 and 416, respectively. The integrator 406, in contrast, employs a clock input PRECHARGEB where a low input will serve to precharge-null the integrator's differential output from the portion of the clock signal propagating along path 412.

One of the fundamental differences between the receiver circuit 400 of FIG. 4, and the receiver circuit 200 of FIG. 2 involves the phase relationship between the clock and data signals. Since the integrator carries on the data receiving role for the circuit 400, and incurs an inherent 90 degree delay in its output, a 90 degree delay in the clock is not used when receiving the data with optimum timing margin. Thus in this embodiment the clock accompanies the data in-phase and is not centered within the data bit.

With continued reference to FIG. 4, the receiver circuit 400 may optionally employ one or more of a variety of delay circuits 418, 420, and 422 disposed in the respective clock paths 412, 414, and 416 to compensate for delays incurred by the data signals. For instance, delay circuit 418 delays the prechargeB portion of the clock signal by a time interval sufficient to compensate for the data delay through optional amplifier 408 and a desired precharge-specific window delay to affect where the integrator initiates its integration operation. Delay circuit 420 performs similarly by applying a variable delay to the sense portion of the clock signal. Typically when windowing the integration window down from a full 1-UI setting precharge delay 418 is increased relative to sense delay 420. The edge clock delay circuit 422 delays the clock signal by half the delay applied to the precharge signal by delay circuit 418. This is performed to support the window integrating function while still allowing the first direct (data) sampler to sample in the middle of the transition region. The delay circuits may take the form of delay lines, verniers, FIFO's or the like in order to impart the desired delay. In some embodiments the delay of sense delay block 422 is set to be half of that of precharge delay 418 in order to compensate for the relative positions of the window within the eye vs. the transition region as seen by sampler 404.

Figure 5:
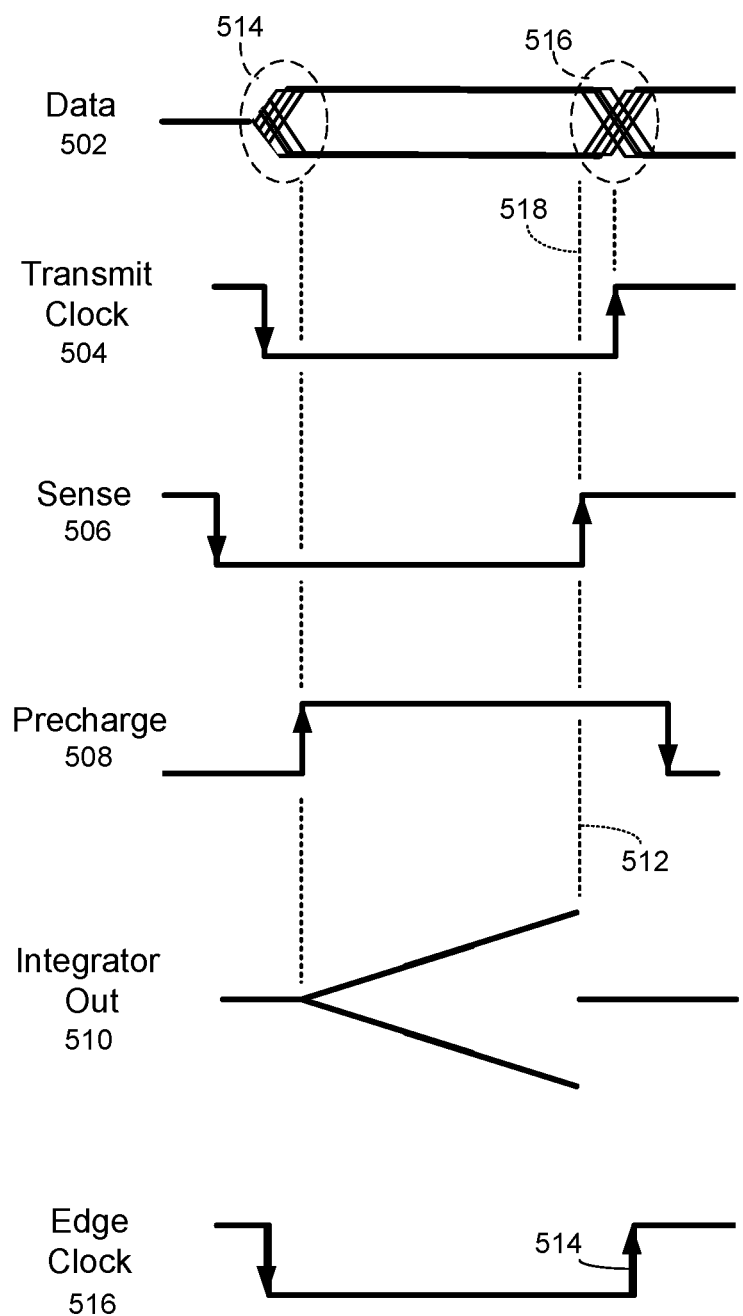
FIG. 5 illustrates a timing diagram relating to the receiver apparatus of FIG. 4.

FIG. 5 illustrates a timing diagram showing the operation of data and edge sampling circuit 400 in a DDR environment. The timing diagram is similar to the diagram illustrated in FIG. 3, with the X-axis representing time, and the Y-axis representing voltage levels such as logic signal levels and/or analog voltage levels. A variety of data, clock and integrator output waveforms are shown along the same time scale. The data signal of interest in the data waveform 502 corresponds to an "even" data bit accompanied by an in-phase transmit clock signal 504.

With continued reference to FIG. 5, operation of the data and edge receiving circuit 400 generally involves receiving the data and clock signals that are transmitted from a first integrated circuit transmitter, such as the IC 102 shown in FIG. 1. The data 502 and transmit clock 504 waveforms illustrate the in-phase relationship between the signals, where the transmit clock edges 504 are substantially aligned with the centers of the data transition regions, at 514 and 516.

Further referring to FIG. 5, in one embodiment the data receiver (the integrator circuit 402) detects the data in a windowing manner. Generally, windowing involves pre-adjusting the incoming transmit clock waveform on the transmit IC such that the firing of the sense signal, shown as waveform 506, is time-aligned with the right-most side of the valid data window or left-most side of the transition region (represented by phantom line 518). Usually, the data is delayed by a value in order to set this sense timing. The incoming clock waveform is then split, with the precharge signal being controlled with its own delay circuit 418. While FIG. 5 illustrates edge receiving and delays with reference to the right-side transition region 516 of the data bit, the sampler and associated timing could just as well be referenced to the left side of the data bit with minor changes, depending on the CDR logic.

As the integrator 406 receives the data signal from along path 407, the prechargeB signal, at 508, is delayed by the precharge delay line 418 a predetermined timing interval to frame the start of the integration, shown by the integration output waveform, at 510. The sense signal also undergoes a delay (controlled by delay line 420), that together with the precharge delay, defines the width of the uncertainty region to frame the end of the integration interval, and triggers the second direct sampler 410 to sample the integrator output.

While the data receiver 402 carries out its integrating function, the edge receiver (the first direct sampler 404) responds to the rising edge 514 of the edge clock waveform 516, optionally delayed by half the delay applied to the precharge signal by delay block 422, to take an edge sample within the transition region of the data eye. The respective data and edge values may then be compared, evaluated, and employed in various ways to effect phase corrections between the data and clock signals as was previously discussed.

The edge and data receivers described above provide significant power savings and pin efficiency, primarily as they eliminate the need for 90-degree clocks to be used directly to generate edge and data information. Additionally, optional CDR logic may be employed to selectively disable the edge sampler when not in use. This is especially convenient in certain mesochronous systems where the phase information is often only periodically updated. Moreover, because a separate 90 degree clock is unnecessary, the use of power-hungry PLLs may be minimized on the receive-side IC. Additionally, eliminating the second 90 degree clock corresponds to a direct reduction in pin count for the IC. Finally, with PLLs eliminated or minimized on the receive-side IC clocks can more rapidly be enabled and disabled, allowing for more effective duty-cycling of the link's active and power-savings states.

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

I claim:

1. An integrated circuit receiver comprising:
   a data receiving circuit including an integrating receiver, the integrating receiver including a data input to receive a data signal of a first frequency and a timing signal input to receive a timing signal exhibiting the first frequency, the integrating receiver to generate an integrated data output signal in response to the timing signal, the data receiving circuit including a sampler to sample the integrated data output signal to detect a data signal level in a valid data region of the data signal; and
   an edge receiving circuit including a non-integrating receiver to receive the data signal and to detect a signal level in a transition region of the data signal, the transition region at an end of the valid data region.

2. The integrated circuit receiver according to claim 1, further comprising:
   a data input port to receive the data signal from an off-chip data path; and
   a timing input port to receive the timing signal from an off-chip timing signal path that is separate from the off-chip data path.

3. The integrated circuit receiver according to claim 2, wherein the timing signal is received from the off-chip timing signal path in an accompanying synchronous relationship with the data signal as-received from the off-chip data signal path.

4. The integrated circuit receiver according to claim 1, wherein the timing signal includes a precharge interval and a sense interval and wherein:
   the integrating receiver circuit includes a windowed integrator responsive to a selectively delayed precharge interval and a selectively delayed sense interval.

5. The integrated circuit receiver according to claim 1, and further including:
   circuitry to selectively disable the edge receiving circuit.

6. The integrated circuit receiver according to claim 1, wherein:
   the edge receiving circuit is configured to generate early/late information based on detecting the signal level in the transition region of the data signal, the early/late information for use by a timing control circuit to adjust the relative phases of the timing signal and the data signal.

7. The integrated circuit receiver according to claim 6, wherein the timing control circuit is disposed in the integrated circuit receiver.

8. The integrated circuit receiver according to claim 1, wherein the timing signal comprises a clock signal.

9. A method of operation in an integrated circuit receiver, the method comprising:
   receiving, at a data signal input, a data signal of a first frequency and having a valid data region and a transition region;
   receiving a timing signal that exhibits the first frequency;
   detecting a data value in the valid data region in response to the timing signal in an integrating manner;
   detecting an edge value in the transition region in response to the timing signal in a non-integrating manner to generate early/late information;
   wherein detecting the data value in the valid data region comprises receiving the timing signal at a timing signal input of an integrating receiver, and integrating the data signal in response to the timing signal with the integrating receiver to generate an integrated output and sampling the integrated output with a sampler.

10. The method according to claim 9, wherein the data signal and the timing signal are received in an in-phase relationship, and wherein detecting the data value in the valid data region comprises:
    integrating over an interval corresponding to respective precharge and sense portions of the timing signal;
    generating an integrated output; and
    sampling the integrated output to generate the data value.

11. The method according to claim 9, wherein detecting an edge value in the data transition region comprises directly sampling the data transition region.

12. The method according to claim 9, wherein the timing signal comprises a clock signal.

13. The method according to claim 9, wherein the timing signal comprises a strobe signal.

14. The method according to claim 9, further comprising: selectively disabling the edge receiving circuit.

15. The method according to claim 9, wherein detecting the data value comprises:
    performing a windowed integration operation responsive to a selectively delayed precharge interval and a selectively delayed sense interval.

16. An integrated circuit (IC) chip, comprising:
    receiver circuitry to receive a data signal from an off-chip data signal path, the data signal having a valid data region and a transition region, the receiver circuitry to receive a timing signal from an off-chip timing signal path that is separate from the data signal path, the receiver circuitry including
        a data receiving circuit including an integrating receiver to receive the data signal and generate an integrated data output signal in response to the timing signal, the data receiving circuit including a sampler to sample the integrated data output signal to detect a data signal level in a valid data region of the data signal; and
        an edge receiving circuit including a non-integrating receiver to receive the data signal and to detect a signal level in a transition region of the data signal, the transition region at an end of the valid data region.

17. The IC chip according to claim 16, wherein:
the integrating receiver includes a timing signal input to receive the timing signal.

18. The IC chip according to claim 16, wherein the timing signal includes a precharge interval and a sense interval and wherein:
the integrating receiver circuit includes a windowed integrator responsive to a selectively delayed precharge interval and a selectively delayed sense interval.

19. The IC chip according to claim 16, and further including:
circuitry to selectively disable the edge receiving circuit.

20. The IC chip according to claim 16, wherein:
the edge receiving circuit is configured to generate early/late information based on detecting a transition of the data signal, the early/late information for use by a timing control circuit to adjust the relative phases of the timing signal and the data signal.

* * * * *